2,891,948

18,20-EPOXYPREGNENE DERIVATIVES

Raphael Pappo, Skokie, Ill., assignor to G. D. Searle & Co., Chicago, Ill., a corporation of Delaware No Drawing. Application September 4, 1958
Serial No. 758,920

7 Claims. (Cl. 260—239.55)

The present invention relates to a new group of 18,20-epoxypregnene derivatives and, more particularly, to the compounds of the structural formula

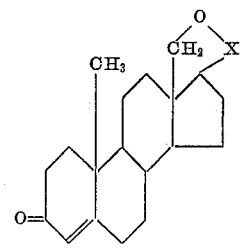

wherein X is a member of the class consisting of

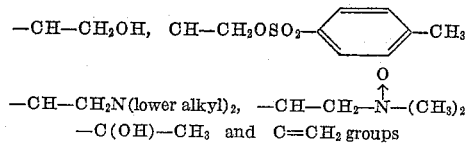

$-C(OH)-CH_3$ and $C=CH_2$ groups and to intermediates for their preparation, and especially 18,20-epoxy-21-di(lower alkyl)amino-5-pregnen-3-ols. The lower alkyl groups referred to hereinabove can be methyl, ethyl, straight-chain or branched propyl, butyl, amyl and hexyl.

The compounds of this invention are valuable steroidal intermediates and hormonal agents. These epoxides are also barbiturate potentiators. Furthermore, the compounds in which X represents a —CH—CH$_2$N(lower alkyl)$_2$ group form quaternary ammonium salts with a variety of organic esters of sulfuric, hydrohalic and aromatic sulfonic acids. Among such esters are methyl chloride, bromide and iodide; ethyl chloride, propyl chloride, butyl bromide, isobutyl chloride, benzyl chloride, phenethyl chloride, napthylmethyl chloride, dimethyl sulfate, methyl benzenesulfonate, ethyl toluenesulfonate, ethylene chlorohydrin, propylene chlorohydrin, allyl chloride, methallyl bromide and crotyl bromide. Such quaternary salts, and especially the methohalides, are ganglion blocking agents. The 4-pregnen-3-ones of this invention also cause sodium excretion and the 18,20-epoxy-20-hydroxy-4-pregnen-3-one is a luteoid agent.

The compounds of this invention are conveniently prepared using as starting material conessine. Conessine is reacted with aluminum chloride and sodium borohydride to prepare a boron complex which is then oxidized with chromium trioxide and acetic acid to yield 3-dimethylamino-6-oxoconanine. The latter is quaternized to form the bismethiodide which is then converted to the bis-quaternary hydroxide. The latter is then heated under anhydrous conditions to yield 3,5-cyclo-18-dimethylamino-20-pregnen-6-one. This compound can also be formed directly by refluxing the bismethiodide with an alkali metal tertiary alcoholate. This base is next quaternized, suitably using methyl p-toluenesulfonate. Subsequent treatment of the salt with osmium tetroxide yields 3,5-cyclo-18-trimethylammonium-20,21-dihydroxypregnan-6-one p-toluenesulfonate. Treatment of this salt with an alkali metal tertiary alcoholate yields a 3,5-cyclo-18,20-epoxy-21-hydroxy-pregnan-6-one. This compound is a central nervous depressant and specifically a barbiturate potentiator. Esterification of this alcohol with the p-toluenesulfonic acid and treatment of the p-toluenesulfonate with a dialkylamine in acetonitrile and then with alkali yields the 3,5-cyclo-18,20-epoxy-21-di(lower alkyl)aminopregnan-6-one of the structural formula

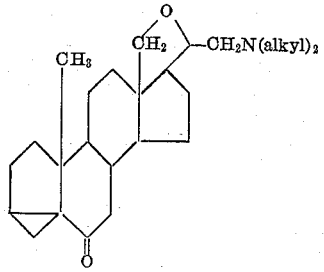

These bases form methohalides which are ganglion agents. Reduction with lithium aluminum hydride yields the corresponding 6-hydroxy compounds and the methohalides again are ganglion blocking agents. Treatment of the base first with formic acid and then with alkali yields the 18,20-epoxy-21-di(lower alkyl)amino-5-pregnen-3-ol which, on Oppenauer oxidation forms the 18,20-epoxy-21-di(lower alkyl)amino-4-pregnen-3-one. These compounds also form quaternary salts which are ganglion blocking agents.

Treatment of the 18,20-epoxy-21-dimethylamino-4-pregnen-3-one with a peroxy acid such as peroxybenzoic acid or hydrogen peroxide yields the N-oxide which on heating forms 18,20-epoxy-4,20-pregnadien-3-one. The latter, on treatment with aqueous acid, yields 18,20-epoxy-20-hydroxy-4-pregnen-3-one, a luteoid agent and an inhibitor of desoxycorticosterone.

3,5-cyclo-18,20-epoxy-21-dimethylaminopregnan-6-one, on treatment first with a peroxyacid and then with alkali yields the N-oxide which on heating, yields 3,5-cyclo-18,20-epoxy-20-pregnen-6-one. The latter, upon treatment with aqueous acid yields 3,5-cyclo-18,20-epoxy-20-hydroxypregnan-6-one, a barbiturate potentiator.

The compounds which constitute this invention will appear in further detail from the following examples which are given for the purpose of illustration only and are not to be construed as limiting the invention in spirit or in scope. In these examples quantities are indicated as parts by weight.

This application is a continuation-in-part of applicant's co-pending application Serial No. 736,963, filed May 22, 1958.

*Example 1*

To a stirred solution of 60 parts of sodium borohydride and 65 parts of aluminum chloride in 1000 parts of anhydrous β,β'-dimethoxydiethyl ether are added 80 parts of finely divided conessine. The walls of the vessel are washed with 100 parts of β,β'-dimethoxydiethyl ether and the mixture is stirred and heated under nitrogen at 60–70° C. for 10 hours. The mixture is then cooled in ice and treated cautiously with an excess of chilled hydrochloric acid. A large amount of hydrogen is evolved with simultaneous appearance of a grayish-white precipitate of sodium chloride. After standing for 12 hours at room temperature the mixture is filtered and the sodium chloride is washed with benzene. The combined filtrate and washings are treated with excess aqueous sodium hydroxide and the organic layer is separated by decantation. The aqueous layer is extracted with benzene and the combined organic solutions are dried over anhydrous sodium sulfate and concentrated under reduced pressure to a viscous gum. The boron compound thus obtained is dissolved in 800 parts of acetic acid and, while agitated, is treated in the course of 7 hours by the gradual addition of a solution of 200 parts of chromic anhydride in 200 parts of water while the temperature is maintained at 17–25° C. Agitation at room temperature is continued for 12 hours after which the mixture is stirred for 5 hours with 40 parts of 2-propanol and then concentrated under reduced pressure to a viscous residue which is diluted with water, cooled, stirred and treated by slow addition with an excess of a 40% aqueous sodium hydroxide solution. The deep green mixture is extracted repeatedly with a mixture of ether in benzene. The combined organic solutions are carefully washed with water, dried over anhydrous sodium sulfate and concentrated under reduced pressure to dryness. The residue is dissolved in a minimum amount of benzene, filtered to remove some insoluble material and the filtrate is taken to dryness to yield crystalline 3-dimethylamino-6-oxoconanine. The compound is sufficiently pure for the preparations described hereinbelow. Further purification can be achieved by filtering a benzene solution of this compound through 400 parts of an adsorbent containing 15% magnesium dioxide and 85% silicon dioxide and washing the adsorbent with a 1:1 mixture of ether in benzene. On concentration of the eluate and recrystallization of the residue from benzene and petroleum ether the compound melts at about 198–203° C. The rotation of a 0.45% chloroform solution $\alpha_D$ is +11.1°. Infrared maxima are observed at 3.40, 3.50, 3.62, 5.88, 6.90, 7.24, 8.51 and 9.62 microns.

A solution of 30 parts of 3-dimethylamino-6-oxoconanine in 250 parts of methanol is refluxed and stirred with 114 parts of iodomethane for 12 hours under nitrogen. The mixture is then concentrated to about 120 parts and allowed to cool to room temperature. The crystals are collected on a filter, washed with methanol and dried to yield the bismethiodide of 3-dimethylamino-6-oxoconanine melting above 300° C.

55 parts of the bismethiodide of 3-dimethylamino-6-oxoconanine are stirred and refluxed under nitrogen with a solution of 14 parts of potassium metal in 240 parts of tertiary butanol. After 4.5 hours 120 parts of solvent are removed by distillation and the residue is diluted with 540 parts of dry toluene and the distillation is continued. This process is repeated twice using two 240 part portions of anhydrous toluene. When a total of 900 parts of solvent has been distilled off the mixture is cooled in ice and stirred with ice and water. The organic layer is separated by decantation and washed with water. The combined aqueous phases are extracted with ether. The ether extract is washed with water and combined with the toluene layer. The organic extracts are dried over anhydrous sodium sulfate and concentrated to dryness under vacuum on the steam bath. On recrystallization from acetonitrile there is obtained 3,5-cyclo-18-dimethylamino-20-pregnen-6-one melting at about 73–75° C., resolidifying and remelting at 84–85° C. An additional crystalline modification obtained in elongated prisms melting at about 87–88° C., can be isolated from methanol.

A mixture of 3 parts of 3,5-cyclo-18-dimethylamino-20-pregnen-6-one in 30 parts of benzene and 12 parts of methyl p-toluenesulfonate is refluxed for 3 days. The solvent is then removed under nitrogen on the steam bath and ether is added slowly. The resulting precipitate is collected on a filter and washed with a mixture of ether in benzene and dried. The resulting amorphous product is triturated with boiling benzene and the mixture is allowed to cool. There is thus obtained 3,5-cyclo-18-trimethylammonium-20-pregnen-6-one p-toluenesulfonate melting at about 205–210° C.

To a solution of 2.7 parts of 3,5-cyclo-18-trimethylammonium-20-pregnen-6-one p-toluenesulfonate in 7.8 parts of anhydrous acetonitrile and 8 parts of benzene are added 1.5 parts of osmium tetroxide. The mixture is maintained at room temperature for 40 hours, after which it is diluted with 8 parts of acetonitrile and treated with excess hydrogen sulfide for 35 minutes. The resulting mixture is filtered and the precipitate is washed with acetonitrile, benzene and ethanol. The filtrate is taken to dryness to yield 3,5-cyclo-18-trimethylammonium-20,21-dihydroxypregnan-6-one p-toluenesulfonate.

To 0.7 part of this quaternary salt is added a solution of 1 part of potassium in 20 parts of tertiary butanol. The mixture is stirred with reflux under nitrogen for 2 hours, then diluted with water and concentrated under nitrogen on the steam bath. The aqueous residue is extracted with ether and the ether extract is washed with 20% aqueous sodium hydroxide, then with cold 3% aqueous hydrochloric acid, sodium hydroxide, and water and dried. On evaporation of the solvent a partially crystalline, neutral product is obtained which is triturated with ether. The 3,5-cyclo-18,20-epoxy-21-hydroxypregnan-6-one thus obtained has the structural formula.

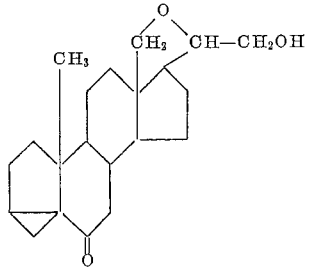

Recrystallized from benzene and then from methanol it melts at about 185–188° C. Infrared maxima are observed at 2.84, 3.40, 3.46, 5.95, 7.26, 7.67, 8.56, 8.83, 9.61, 9.70, and 11.95 microns. The mother liquor contains 3,5-cyclo-18,21-epoxy-20-hydroxypregnan-6-one.

The hydrochloric acid extract, after treatment with excess aqueous sodium hydroxide yields the crude 3,5-cyclo-18-dimethylamino-20,21-dihydroxypregnan - 6 - one melting at about 185–195° C. The infrared spectrum was identical with that of a product obtained directly from the treatment of 3,5-cyclo-18-dimethylamino-20-pregnen-6-one with osmium tetroxide.

*Example 2*

A solution of 0.241 part of 3,5-cyclo-18,20-epoxy-21-hydroxypregnan-6-one in 1.6 parts of pyridine is stirred with 0.226 part of p-toluenesulfonyl chloride. After 10 hours the mixture is cooled in ice and treated with 0.2 part of water for 30 minutes. The solution is then taken up in ether, washed successively with aqueous sulfuric acid, water, aqueous sodium hydroxide and again with water and dried. The ether is removed under nitrogen on the steam bath and the residue is crystallized from ether to yield the p-toluenesulfonate of 3,5-cyclo-18,20-epoxy-21-hydroxypregnan-6-one melting at about 142–143° C.

*Example 3*

A solution of 15.5 parts of the p-toluenesulfonate of 3,5-cyclo-18,20-epoxy-21-hydroxypregnan-6-one in 350 parts of a 30% solution of dimethylamine in anhydrous acetonitrile is maintained at room temperature for a week and then is taken to dryness at room temperature under vacuum. The residue is taken up in a mixture of ether and benzene and then separated into neutral and basic fractions by extraction with 0.5 N aqueous hydrochloric acid. The neutral fraction contains a small amount of unconverted starting material. The acidic extract is rendered alkaline and recrystallized from methanol and then from a mixture of benzene and petroleum ether to yield 3,5-cyclo-18,20-epoxy-21-dimethylaminopregnan-6-one which melts at about 145–147° C. Infrared maxima are observed at 3.37, 3.41, 3.47, 3.56, 5.94, 6.87, 7.26, 7.69, 9.62, 9.75, 9.82, 9.94 and 10.09 microns. The compound has the structural formula

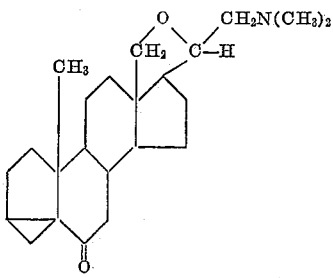

Example 4

Substitution of an equivalent amount of diethylamine for the dimethylamine used in the preceding example yields 3,5-cyclo-18,20-epoxy-21-diethylaminopregnan-6-one. The ultraviolet absorption spectrum shows a maximum at 208 millimicrons and has a molecular extinction coefficient of about 5600. Infrared maxima are observed at 3.37, 3.41, 3.47, 3.56, 5.94, 6.87, 7.26, and 9.75 microns.

Example 5

A solution of 0.16 part of 3,5-cyclo-18,20-epoxy-21-dimethylaminopregnan-6-one in 1 part of benzene is treated with 2.7 parts of an 0.16 molar solution of peroxybenzoic acid in benzene. After standing for 10 minutes at 5° C. the solution is diluted with ether and extracted with 2% aqueous sodium hydroxide. This extract is washed with ether and then extracted with chloroform. The chloroform extract is concentrated under vacuum and the resulting gum is crystallized from acetone. There is thus obtained 3,5-cyclo-18,20-epoxy-21-dimethylaminopregnan-6-one N-oxide in elongated prisms which melt at about 188–190° C. with decomposition after previous sintering at about 185° C. The infrared absorption spectrum shows a broad and strong band at 2.8 to 3.3 microns and a strong peak at 5.9 microns; other maxima are seen at 6.85, 7.26, 7.70, 8.83, 9.70, 9.80, and 10.83 microns.

Example 6

At 170° C. 0.64 part of 3,5-cyclo-18,20-epoxy-21-dimethylaminopregnan-6-one N-oxide are added rapidly to 21.5 parts of anhydrous tertiary p-butyl toluene. The mixture is rapidly brought to reflux, stirred and slowly distilled under nitrogen so that after 25 minutes about 9 parts of distillate are collected. The solution is then quickly cooled to room temperature. The solvent is removed under vacuum at a temperature below 70° C. The residue, which solidifies completely, is triturated with ether to yield 3,5-cyclo-18,20-epoxy-20-pregnen-6-one melting at about 174–185° C. Very strong infrared maxima are obtained at 9.71 and 12.78 microns; other maxima are seen at 3.32, 3.42, 3.50, 5.94, 5.99, (shoulder) 6.37, 7.30, 7.60, 7.74, 8.1, 8.62 and 11.43 microns. The compound has the structural formula

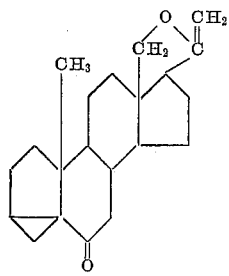

The same compound can be obtained by the following procedure. A solution of 0.2 part of the p-toluenesulfonate of 3,5-cyclo-18,20-epoxy-21-hydroxypregnan-6-one in 2 parts of toluene is treated with a solution of 0.08 part of potassium metal in 2 parts of tertiary butanol under nitrogen. After refluxing for 1 hour, the mixture is cooled, diluted with ether, washed with water, dried and taken to dryness, to yield a mixture of 3,5-cyclo-18,20-epoxy-17-pregnen-6-one and 3,5-cyclo-18,20-epoxy-20-pregnen-6-one.

Example 7

A solution of 0.2 part of 3,5-cyclo-18,20-epoxy-20-pregnen-6-one in 5 parts of dioxane is treated with 1 part of 0.5 N aqueous hydrochloric acid. The homogeneous solution is permitted to stand at room temperature for 90 minutes and is then diluted with ether and washed successively with 0.5 N aqueous hydrochloric acid, 5% aqueous sodium hydroxide, and water. After drying over anhydrous sodium sulfate, the solvent is evaporated on a steam bath under nitrogen and the residue is recrystallized from butanone to yield 3,5-cyclo-18,20-epoxy-20-hydroxypregnan-6-one melting at about 162–177° C. Strong infrared maxima are observed at 2.90 and 5.98 microns, other maxima at 3.38, 3.42, 3.48, 6.87, 7.27, 7.68, 8.88, 9.73 and 11.24 microns. The compound has the structural formula

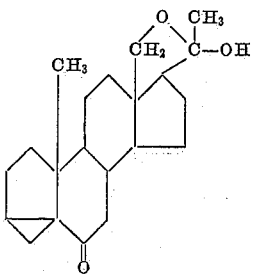

The evidence points to the fact that the product is obtained as a stable hemiketal rather than as the 3,5-cyclo-18-hydroxypregnan-6-one.

Example 8

A solution of 1.44 parts of 3,5-cyclo-18,20-epoxy-21-dimethylaminopregnan-6-one in 10 parts of commercial tetrahydrofuran is added to a solution of 1.5 parts of lithium aluminum hydride in 25 parts of tetrahydrofuran. After refluxing under nitrogen for 30 minutes the mixture is stirred for 4 hours at room temperature and then treated successively with 1.6 parts of water and 6 parts of tetrahydrofuran, 1.2 parts of 20% aqueous sodium hydroxide and 5.5 parts of water. The white suspension is diluted with an equal volume of ether, stirred and cooled to room temperature during 15 minutes. It is then filtered and the inorganic precipitate is washed thoroughly with ether. The combined filtrate and the washings are evaporated to a small volume on the steam bath under nitrogen. On cooling a precipitate forms which is stirred with a large amount of water. Crystals are then collected on a filter, washed with water and dried under vacuum at 60° C. After trituration with ether the 3,5-cyclo-18,20-epoxy-21-dimethylaminopregnan-6-ol melts at about 133–137° C. Infrared maxima are observed at 3.04, 3.38, 3.42, 3.50, 3.59, 6.80, 6.85, 9.24, 9.50, 9.72, 9.78, and 11.78 microns

Example 9

A solution of 1.32 parts of the 3,5-cyclo-18,20-epoxy-21-dimethylaminopregnan-6-ol, obtained in the preceding example, in 35.5 parts of 98% formic acid is maintained at room temperature for 48 hours and then concentrated under vacuum at 20° C. The residue is diluted with 20 parts of methanol, neutralized with 50% aqueous potassium hydroxide and then treated with 5 parts of 50% aqueous potassium hydroxide. The mixture is heated at 60° C. for 3 hours and then concentrated to a small volume under nitrogen on a steam bath. The resulting crystalline suspension is extracted with ether and the extract is washed with water, dried, and taken to dryness under nitrogen. The crystalline residue is recrystallized from benzene to yield 18,20-epoxy-21-dimethylamino-5-pregnen-3-ol melting at about 160–163° C. Infrared maxima are observed at 2.85, 3.40, 3.48, 3.51, 3.68, 6.85, 9.20, 9.46, 9.60 and 11.75 microns. The compound has the structural formula

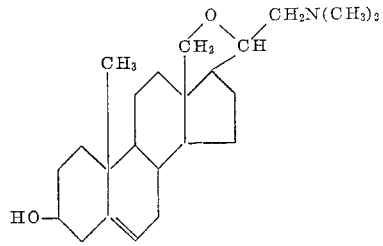

By subjecting to the procedure of the preceding example 3,5-cyclo-18,20-epoxy-21-diethylaminopregnan-6-one there is obtained the 3,5-cyclo-18,20-epoxy-21-diethylaminopregnan-6-ol which shows infrared maxima at 3.00, 3.38, 3.42, 3.50, 3.59, 6.80, and 9.72 microns. On treatment with formic acid and then with base as in the foregoing procedure there is obtained 18,20-epoxy-21-diethylamino-5-pregnen-3-ol which shows infrared maxima at 2.85, 3.40, 3.48, 3.51, 3.68, 6.85, and 9.60 microns.

*Example 10*

A solution containing 0.73 part of 18,20-epoxy-21-dimethylamino-5-pregnen-3-ol in 19 parts of toluene and 7.1 parts of cyclohexanone is distilled under nitrogen until 4 parts of distillate are collected. The stirred mixture is then treated with 0.8 part of aluminum isopropoxide and the distillation is continued for 35 minutes while 4 additional parts of distillate are collected. The gelatinous mixture is quickly cooled under ice and stirred for 45 minutes with 20 parts of 0.5 N aqueous hydrochloric acid and 15 parts of ether. The mixture is diluted with more ether and extracted with 0.5 N aqueous hydrochloric acid. The extract is washed with ether and the pH is raised to 9–10 by addition of cold aqueous potassium hydroxide. The base is then quickly extracted with ether. The ether extract is washed with water, dried and taken to dryness under nitrogen. The residue is then dried under vacuum to yield 18,20-epoxy-21-dimethylamino-4-pregnen-3-one melting at about 121.5–123° C. Infrared maxima are observed at 3.41, 3.50, 3.60, 5.95, 6.20, 6.80, 6.91, 7.87, 9.61, 11.5 and 11.80 microns. The compound has the structural formula

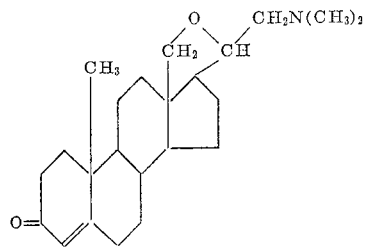

Identical treatment of 18,20-epoxy-21-diethylamino-5-pregnen-3-ol yields 18,20-epoxy-21-diethylamino-4-pregnen-3-one. The ultraviolet absorption spectrum shows a maximum at 240.5 millimicrons with a molecular extinction coefficient at 17,136. Infrared maxima are observed at 3.41, 3.50, 3.60, 5.98, 6.2, 6.80 and 9.61 microns.

*Example 11*

A solution of 0.45 part of 18,20-epoxy-21-dimethylamino-4-pregnen-3-one in 3 parts of benzene is treated by slow portionwise addition with 5.2 parts of cold 0.23- molar peroxybenzoic acid solution in benzene. After 1 minute the mixture is diluted with ether and extracted with a solution of 0.2 part of sodium hydroxide in 15 parts of water and then with water. The combined aqueous extracts are then extracted with chloroform. The chloroform solution is concentrated to dryness under vacuum at a temperature of less than 40° C. and the resulting residue is recrystallized from acetone to yield 18,20-epoxy-21-dimethylamino-4-pregnen-3-one N-oxide melting at about 185–187° C. with decomposition. An ultraviolet absorption maximum at 240.5 millimicrons shows an extinction coefficient of 15,300. Infrared maxima are observed at 2.80 to 3.30, 3.42, 3.50, 5.95, 6.18, 6.90, 9.67, and 9.77 microns.

*Example 12*

At a temperature of 140–150° C., 0.41 part of 18,20-epoxy-21-dimethylamino-4-pregnen-3-one N-oxide are added to 22 parts of anhydrous tertiarybutylbenzene. The mixture is quickly brought to boiling and slowly distilled under nitrogen until after about 20 minutes 10 parts of distillate are collected. The solution is then rapidly cooled in ice and taken to dryness under vacuum at a temperature below 60° C. The residual gum shows a strong infrared absorption in the region of 12.7 microns characteristic of a vinyl ether. Other infrared maxima shown by 18,20-epoxy-4,20-pregnadien-3-one are observed at 3.40, 3.49, 5.95, 6.18, 9.58, and 11.56 microns. The compound has the structural formula

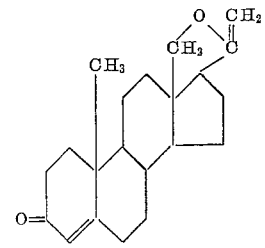

*Example 13*

A solution of 18,20-epoxy-4,20-pregnadien-3-one, as obtained in the preceding example, in 10 parts of dioxane is treated for 1 hour with 5 parts of 0.5 N aqueous hydrochloric acid. The mixture is then diluted with ether, washed successively with 0.5 N aqueous hydrochloric acid, water, aqueous sodium hydroxide and again with water and dried. The resulting solution is concentrated to dryness under nitrogen to yield 18,20-epoxy-20-hydroxy-4-pregnen-3-one which, on trituration with ether, followed by recrystallization from butanone gives needles melting at about 173–182° C. The ultraviolet absorption spectrum shows a maximum at 241 millimicrons with a molecular extinction coefficient of about 17,100. Infrared maxima are observed at 2.92, 3.42, 3.48, 5.95, 6.18, 8.93, 9.62, 10.71, 11.18 and 11.76 microns. The compound has the structural formula

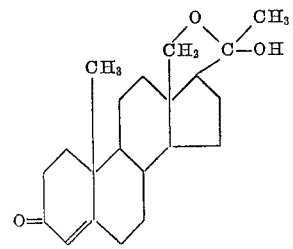

The fact that the infrared spectrum does not show a maximum characteristic for a saturated carbonyl group in the region of 5.8 to 5.9 microns indicates that this material exists entirely in the hemi-ketal form rather than as 18-hydroxyprogesterone.

What is claimed is:
1. A compound of the structural formula

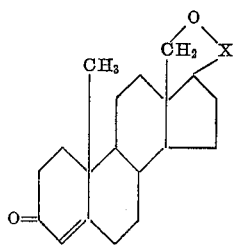

wherein X is a member of the class consisting of

CH—CH$_2$N(lower alkyl)$_2$, CH—CH$_2$N(CH$_3$)$_2$↑O

C=CH$_2$ and C(OH)—CH$_3$ groups 2. 18,20-epoxy-21-di(lower alkyl)amino-4-pregnen-3-one.
3. 18,20-epoxy-21-dimethylamino-4-pregnen-3-one.
4. 18,20-epoxy-21-dimethylamino-4-pregnen-3-one N-oxide.
5. 18,20-epoxy-4,20-pregnadien-3-one.
6. 18,20-epoxy-20-hydroxy-4-pregnen-3-one.
7. 18,20-epoxy-21-di(lower alkyl)amino-5-pregnen-3-ol.

No references cited.